United States Patent
Qin et al.

(10) Patent No.: US 12,116,470 B2
(45) Date of Patent: Oct. 15, 2024

(54) COMPOSITE POLYVINYL ALCOHOL PRESERVATIVE FILM, PREPARATION METHOD AND APPLICATION THEREOF

(71) Applicant: Guizhou Material Industrial Technology Institute, Guiyang (CN)

(72) Inventors: Shuhao Qin, Guiyang (CN); Li Zhang, Bijie (CN); Shanshan Luo, Guiyang (CN); Juan Li, Guiyang (CN); Chengtao Gao, Guiyang (CN); Yanwen Wang, Tongren (CN); Lu Song, Guiyang (CN)

(73) Assignee: GUIZHOU MATERIAL INDUSTRIAL TECHNOLOGY INSTITUTE, Guiyang (CN)

( * ) Notice: Subject to any disclaimer, the term of this patent is extended or adjusted under 35 U.S.C. 154(b) by 27 days.

(21) Appl. No.: 18/126,297

(22) Filed: Mar. 24, 2023

(65) Prior Publication Data
US 2023/0374272 A1  Nov. 23, 2023

(30) Foreign Application Priority Data
May 20, 2022  (CN) .......................... 202210553702.7

(51) Int. Cl.
C08K 9/06    (2006.01)
C08J 5/18    (2006.01)
C08K 3/22    (2006.01)
C09C 1/30    (2006.01)

(52) U.S. Cl.
CPC ........ *C08K 9/06* (2013.01); *C08J 5/18* (2013.01); *C08K 3/22* (2013.01); *C09C 1/3027* (2013.01); *C09C 1/3081* (2013.01); *C09C 1/309* (2013.01); *C08J 2329/04* (2013.01); *C08K 2003/2241* (2013.01); *C08K 2201/005* (2013.01)

(58) Field of Classification Search
None
See application file for complete search history.

(56) References Cited

PUBLICATIONS

Crystal Structure and Microwave Dielectric Properties of ATiO3, ATa2O6, AWO4 (A =Ni, Mg, Co) Ceramics, Eung Soo Kim, 2009 18th IEEE international symposium on the applications of ferroelectrics, pp. 1-6.
Effect of B2O3 Additives on Sintering and Microwave Dielectric Behaviors of CuO-Doped ZnNb2O6 Ceramics, Cheng-Liang Huang, The Japan Society of Applied Physics, pp. 758-762.
CNIPA, Notification of a First Office Action for CN202210553702.7, Jul. 15, 2023.
Guizhou Material Industry Technology Research Institute (Applicant), Reply to Notification of a First Office Action for CN202210553702.7, w/ replacement claims, Nov. 13, 2023.
Guizhou Material Industry Technology Research Institute (Applicant), Supplemental Reply to Notification of a First Office Action for CN202210553702.7, w/ (allowed) replacement claims, Jan. 26, 2024.
CNIPA, Notification to grant patent right for invention in CN202210553702.7, Jan. 31, 2024.

*Primary Examiner* — Robert T Butcher
(74) *Attorney, Agent, or Firm* — Tutunjian & Bitetto, P.C.

(57) ABSTRACT

A composite polyvinyl alcohol (PVA) preservative film, a preparation method and an application thereof are provided. The film includes PVA of 9-12 parts, modified silicon dioxide nanoparticles of 2-5 parts, antimicrobial of 0.3-2 parts and deionized water of 100 parts. Fruits and vegetables sensitive to sunlight have lower requirements for illumination while preserving. With PVA as matrix and silicon dioxide ($SiO_2$) nanoparticles as modified materials, composite PVA is obtained by controlling a particle size of $SiO_2$ and modifying its surface. The composite PVA preservative film takes advantages of different refractive indexes between PVA and $SiO_2$ and controlling the particle size of $SiO_2$, thereby having a low luminous transmittance. The preservative film has an effect of light-proof on fruits and vegetables suitable for light-proof storage, and improves its gas transmission and water resistance because of adding $SiO_2$, thereby facilitating packaging preservation of the fruits and vegetables.

2 Claims, 1 Drawing Sheet

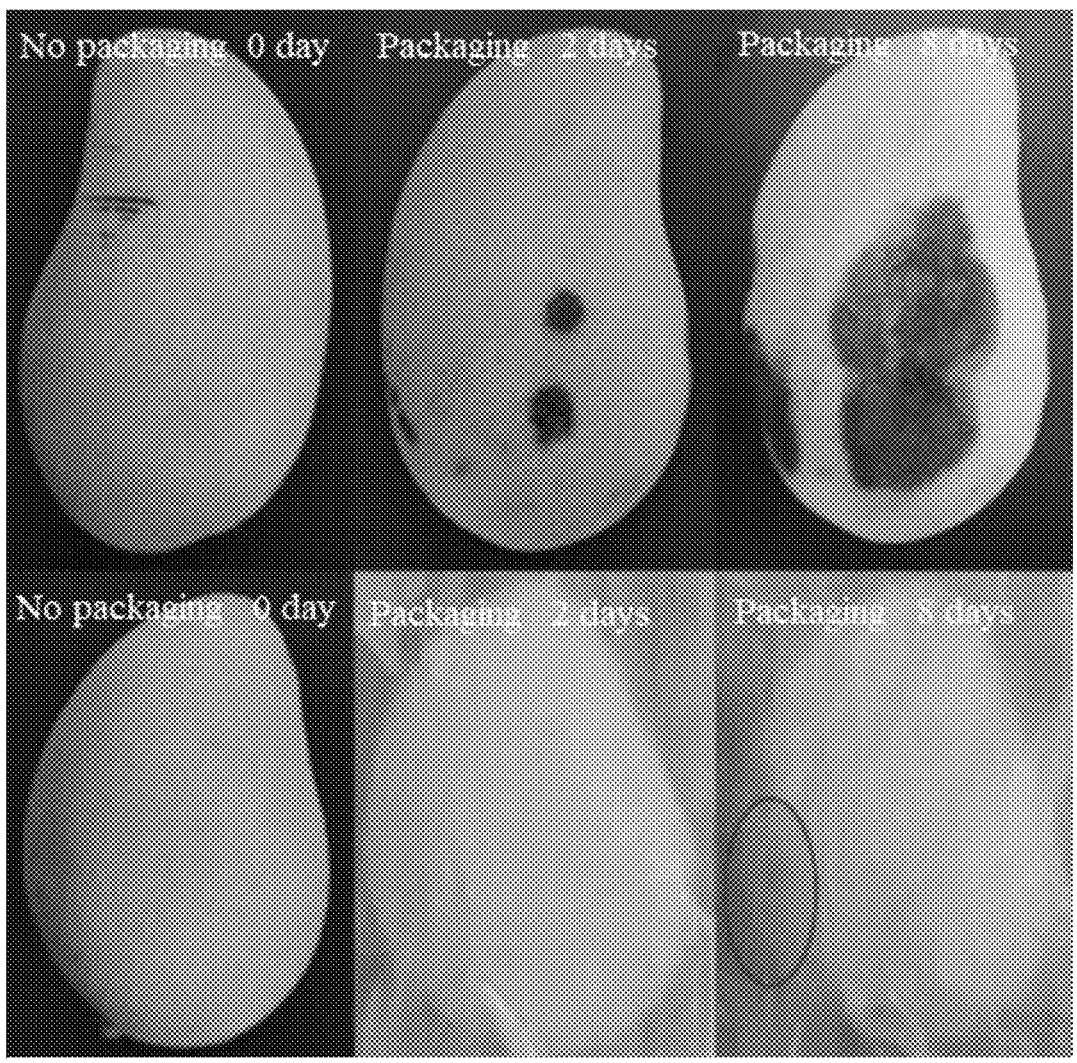

COMPOSITE POLYVINYL ALCOHOL PRESERVATIVE FILM, PREPARATION METHOD AND APPLICATION THEREOF

TECHNICAL FIELD

The disclosure relates to the field of preservative film preparation, particularly to a composite polyvinyl alcohol preservative film with a low luminous transmittance, a preparation method and an application thereof.

BACKGROUND

Tropical fruits, such as bananas, mangoes, longans and litchi, are not suitable for freezing storage. They need to be stored in a cool and light-proof place; otherwise their skins are prone to darkening and discoloration. Adverse effects of sunlight on fruits and vegetables are as follows. 1. The sunlight leads to a loss of vitamins, especially vitamin B2, β-carotene and vitamin C, which are photosensitizer. 2. The sunlight can decompose protein to produce free amino acids, which will be further degraded by the sunlight to increase peroxide value, including volatile compounds such as methylthioaldehyde and methyl ketone. 3. The sunlight causes dyes in the fruits and vegetables to oxidize, thereby causing browning. 4. The sunlight reduces an aroma content of the fruits and vegetables, and causes oxidation and rancidity of oil therein, making the taste pale, nutrition and sensory quality decline.

An ability of packaging materials to reflect and scatter the sunlight can protect products. On the one hand, when a refractive index of filler in the preservative film is closer to that of a matrix, a better luminous transmittance of the preservative film can be achieved. When a particle size of the filler is larger than a wavelength of the sunlight, the sunlight is more prone to refraction and scattering, reducing the luminous transmittance, and vice versa. On the other hand, a structure of a dense preservative film can block parts of the sunlight transmitting and can also help to reduce the luminous transmittance.

Generally, the light-proof preservation is achieved by using opaque containers or opaque preservative films as a package. However, the light-proof preservation cannot observe the changes of food in the package, which is not conducive to judging the food quality.

A Chinese patent No. CN11393693A publicized on Jul. 10, 2020 discloses a nano silicon dioxide/polyvinyl alcohol/chitin liquefied product preservative film material, which uses the nano silicon dioxide as a filler and chitin liquefied product as an enhancement phase, and blends the filler and the enhancement phase to improve the thermal stability, flexibility, fresh-keeping and biodegradability of the preservative film. Furthermore, a Chinese patent No. CN110016155A publicized on Jul. 16, 2019 discloses a preparation method of fluorinated polyvinyl alcohol-silicon dioxide single-surface hydrophobic film, which introduces fluorine atoms with low surface energy to improve the hydrophobicity of the film.

At present, although a research on controlling the particle size of the silicon dioxide has been relatively mature, a research on the composite preservative film of silicon dioxide and polyvinyl alcohol is mostly focused on its preparation method and modifying the surface of the silicon dioxide.

SUMMARY

An objective of the disclosure is to illustrate some aspects of embodiments of the disclosure and to briefly describe some illustrated embodiments. Some simplifications or omissions may be made in the following description and in the abstract of the specification and the title of the disclosure to avoid obscuring the objective of the following description, the abstract of the specification and the title of the disclosure, and such simplifications or omissions cannot be used to limit the scope of the disclosure.

In view of the above described problems and/or the problems in the art, the disclosure is provided.

Therefore, the objective of the disclosure is to overcome deficiencies in the art, thereby providing a composite polyvinyl alcohol preservative film with a low luminous transmittance.

In order to solve the above problems, the disclosure provides a technical solution as follows, including a composite polyvinyl alcohol preservative film with a low luminous transmittance.

The composite polyvinyl alcohol preservative film with a low luminous transmittance includes the following raw materials: polyvinyl alcohol (PVA), modified silicon dioxide nanoparticles, antimicrobial and deionized water.

The raw materials in parts by weight are as follows: the PVA with 9 to 12 parts by weight, the modified silicon dioxide nanoparticles with 2 to 5 parts by weight, the antimicrobial with 0.3 to 2 parts by weight, and the deionized water with 100 parts by weight.

In an illustrated embodiment of the disclosure, the PVA is at least one selected from a group consisting of polyvinyl alcohol 1799, polyvinyl alcohol 217, and polyvinyl alcohol 117.

In an illustrated embodiment of the disclosure, a particle size of each of the modified silicon dioxide nanoparticles is at a range of 200 nanometers (nm) to 1000 nm.

In an illustrated embodiment of the disclosure, the particle size of the modified silicon dioxide nanoparticle is at a range of 800 nm to 1000 nm.

In an illustrated embodiment of the disclosure, a preparation method of the modified silicon dioxide nanoparticles includes the following steps:

dispersing silicon dioxide nanoparticles in a toluene solution, adding 2-cyanopropyl triethoxysilane (CTES) to the toluene solution for a reaction at 100 degree Celsius (° C.) for 24 hours (h) to obtain a reaction solution;

cooling the reaction solution, and then filtering, washing and drying to obtain a solid, adding the solid into a dilute sulfuric acid solution to obtain a mixed dilute sulfuric acid solution; and performing a reflux on the mixed dilute sulfuric acid solution, and then cooling, filtering, washing and drying to obtain the modified silicon dioxide nanoparticles.

In an illustrated embodiment of the disclosure, in the dispersing silicon dioxide nanoparticles in a toluene solution, a mass-volume ratio of the silicon dioxide nanoparticles with a unit of gram (g): the toluene solution with a unit of milliliter (mL) is 1:50.

In an illustrated embodiment of the disclosure, in the performing a reflux on the mixed dilute sulfuric acid solution, a temperature of the reflux is 90° C., and a time of the reflux is 3 h.

Another objective of the disclosure is to provide a preparation method of the composite polyvinyl alcohol preservative film with the low luminous transmittance, thereby overcoming the deficiencies in the art.

In order to solve the above problems, the disclosure provides a technical solution of a preparation method of the composite polyvinyl alcohol preservative film with the low luminous transmittance, including the following steps:

mixing the polyvinyl alcohol of different degree of alcoholysis to obtain mixed polyvinyl alcohol, and then adding the deionized water, adjusting potential of hydrogen (pH) of the deionized water to be acid for dissolving the mixed polyvinyl alcohol at a temperature of 90° C. to 95° C. for 2 h to 3 h to obtain a mixed solution; and adding the modified silicon dioxide nanoparticles to the mixed solution to mix together, then adding the antimicrobial into the mixed solution for stirring for 1 h to 2 h, and standing overnight to obtain a standing solution, defoaming the standing solution, and then scraping film to obtain the composite polyvinyl alcohol preservative film.

In an illustrated embodiment of the disclosure, the polyvinyl alcohol, the modified silicon dioxide nanoparticles, the antimicrobial and the deionized water in parts by weight are as follows: the polyvinyl alcohol with 9 to 12 parts by weight, the modified silicon dioxide nanoparticles with 2 to 5 parts by weight, the antimicrobial with 0.3 to 2 parts by weight, and the deionized water with 100 parts by weight.

Still another objective of the disclosure is to provide an application of the composite polyvinyl alcohol preservative film with the low luminous transmittance in preserving tropical fruits, thereby overcoming the deficiencies in the art.

Beneficial effects of the disclosure are as follows. The disclosure provides the composite polyvinyl alcohol preservative film and the preparation method thereof. The fruits and vegetables sensitive to sunlight have lower requirements for illumination while preserving. With polyvinyl alcohol as matrix and silicon dioxide as modified materials, a composite polyvinyl alcohol is obtained by controlling a particle size of the silicon dioxide and modifying the surface. The composite polyvinyl alcohol preservative film with a low luminous transmittance is prepared by taking advantages of a difference between PVA refractive index and silicon dioxide refractive index and controlling the particle size of the silicon dioxide. The composite preservative film has a certain light-proof effect on the fruits and vegetables suitable for light-proof storage, and improves its gas transmission and water resistance because of adding silicon dioxide, thereby facilitating package preservation of the fruits and vegetables.

BRIEF DESCRIPTION OF DRAWING

In order to more clearly illustrate technical solutions of embodiments of the disclosure, the following briefly describes the attached drawing to be used in the embodiments. Apparently, the following description of the attached drawing is merely some embodiments of the disclosure, for those skilled in the art, other drawings can be obtained according to the attached drawing without paying creative effort.

FIG. illustrates a schematic diagram of a comparison of preservation according to an embodiment of the disclosure.

DETAILED DESCRIPTION OF EMBODIMENTS

In order to make the objectives, features and advantages of the disclosure more apparent and understandable, the implementation of the disclosure will be further described in detail with the embodiments.

Many illustrated details are described in the following description to fully understand the disclosure, but the disclosure can also have other implementation different from that described herein. Those skilled in the art can make improvement without violating the protection scope of the disclosure. Therefore, the disclosure is not limited by the illustrated embodiments disclosed below.

In addition, the terms "an embodiment" or "embodiment" herein refer to a specific feature, structure or characteristic that can be included in at least one implementation of the disclosure. The words "in an embodiment" appearing in different places in the disclosure do not all refer to the same embodiment, and not refer to a separate embodiment or an embodiment selectively excluded other embodiments.

Raw materials in parts by weight are as follows: polyvinyl alcohol (PVA) with 9 to 12 parts by weight, modified silicon dioxide nanoparticles with 2 to 5 parts by weight, antimicrobial with 0.3 to 2 parts by weight, and deionized water with 100 parts by weight.

The PVA used for the implementation is a combination of any two selected from a group consisting of polyvinyl alcohol 1799 (referred to the PVA with a degree of alcoholysis of 98% to 99%), polyvinyl alcohol 217 (referred to the PVA with a degree of alcoholysis of 87% to 89%), and polyvinyl alcohol 117 (referred to the PVA with a degree of alcoholysis of 98% to 99%). A particle size of the modified silicon dioxide nanoparticle is at a range of 200 nanometers (nm) to 1000 nm. The antimicrobial is one of titanium dioxide, zinc oxide, nano-silver, chitosan, vanillin, and plant essential oil.

Preparations of the raw materials are as follows.

A preparation method of the modified silicon dioxide nanoparticles includes the following steps: dispersing silicon dioxide nanoparticles with different particle sizes in a toluene solution, adding 2-cyanopropyl triethoxysilane (CTES) to the toluene solution for a reaction at 100 degree Celsius (° C.) for 24 hours (h) to obtain a solid; adding the solid into a dilute sulfuric acid solution; and performing a reflux on the dilute sulfuric acid solution after the solid is added at 90° C. for 3 h, thereafter to obtain the modified silicon dioxide nanoparticles.

A preparation method of the composite polyvinyl alcohol preservative film includes the following steps: mixing the polyvinyl alcohol of different degree of alcoholysis to obtain mixed polyvinyl alcohol, adjusting potential of hydrogen (also referred to pH value) of a solution to be acid for dissolving the mixed polyvinyl alcohol at a temperature of 90° C. for 2 h to obtain a mixed solution; and adding the modified silicon dioxide nanoparticles to the mixed solution to mix together, then adding the antimicrobial into the mixed solution for stirring for 1 h, and standing overnight to obtain a standing solution, defoaming the standing solution, and then scraping film to obtain the composite polyvinyl alcohol preservative film.

A testing method for the composite preservative film includes properties as follows: oxygen transmission and carbon oxide transmission, calculation method of which refers to an international standard GB/T 1038-2000 of *Plastics-Film and sheeting-Determination of gas transmission-Differential-pressure method*, luminous transmittance and haze, calculation method of which refers to an international standard GB/T 2410-2008 of *Determination of the luminous transmittance and haze of transparent plastics*, and freshness degree. A same batch of mangoes without damage, with same hardness and color, and with same size is selected for testing the freshness.

Thereafter, the mangoes are respectively sealed packaging with the prepared composite preservative film and pure film, the hardness and dark speck appearance of the mangoes are used as criteria for judging deterioration.

The 2-cyanopropyl triethoxysilane used in the disclosure is purchased from TCI (Shanghai) Development Chemical Industry Co., Ltd with a purity of greater than 98%. Other raw materials are common products on the market.

Embodiment 1

The disclosure provides a preparation method of a composite polyvinyl alcohol preservative film with a low luminous transmittance, including the following steps.

Step 1 obtains modified silicon dioxide nanoparticles, including the following steps. 1 gram (g) silicon dioxide ($SiO_2$) nanoparticles with the particle size of 1000 nm are dispersed in 50 milliliter (mL) toluene solution. 1.8 mL CTES is added into the toluene solution for a reaction at 100° C. for 24 h to obtain a reaction solution. The reaction solution is cooled down, and then filtered, washed and dried to obtain a solid. The solid is added into a dilute sulfuric acid solution (with a concentration of 49%) to obtain a mixed dilute sulfuric acid solution. The mixed dilute sulfuric acid solution is performed a reflux at 90° C. for 3 h, and then is cooled, filtered, washed and dried to obtain the modified silicon dioxide nanoparticles.

Step 2 obtains the composite polyvinyl alcohol preservative film, including the following steps. 10 g mixed PVA (a mixed volume ratio of PVA-1799:PVA-217 being 1:1) is taken to be added into 100 mL deionized water. 1 mole per litter (mol/L) hydrochloric acid solution is added into the deionized water to adjust pH value of the deionized water to be 3 (referred to an acid solution). A temperature of the deionized water is raised to 90° C. for dissolving the mixed PVA for 2 h with a continuous stirring to obtain a mixed solution. 3 g modified silicon dioxide nanoparticles obtained by the step 1 is added into the mixed solution to mix evenly. And then, 1 g titanium dioxide nanoparticles (with a particle size of 60 nm) are added into the mixed solution, followed by stirring for 1 h. The mixed solution is placed for standing overnight to obtain a standing solution. The standing solution is defoamed and scraped film to obtain the composite polyvinyl alcohol preservative film. And a thickness of the composite polyvinyl alcohol preservative film is 0.02 millimeters (mm).

An oxygen transmission of the composite polyvinyl alcohol preservative film is tested to be $1.14 \times 10^{-5}$ cm$^3$·m/m$^2$·d·Pa (referred to the volume of gas which, under steady conditions, crosses unit area of the sample in unit time under unit pressure difference and at constant temperature), a carbon dioxide transmission is $2.06 \times 10^{-4}$ cm$^3$·m/m$^2$·d·Pa, a luminous transmittance is 85.38%, and a haze is 9.02%. When the obtained composite polyvinyl alcohol preservative film is used to packaging the mango, the luminous transmittance can decrease to some extent, and it is possible to observe whether the mango appears dark speckles, as shown in FIG., the mango does not appear the dark speckles until the 8th day at room temperature, while the unpackaged mango appears the dark speckles on the 2nd day apparently.

Embodiment 2

The disclosure provides a preparation method of a composite polyvinyl alcohol preservative film with a low luminous transmittance, including the following steps.

Step 1 obtains modified silicon dioxide nanoparticles, including the following steps. 1 g $SiO_2$ nanoparticles with the particle size of 200 nm are dispersed in 50 mL toluene solution. 1.8 mL CTES is added into the toluene solution for a reaction at 100° C. for 24 h to obtain a reaction solution. The reaction solution is cooled down, and then filtered, washed and dried to obtain a solid. The solid is added into a dilute sulfuric acid solution (with a concentration of 49%) to obtain a mixed dilute sulfuric acid solution. The mixed dilute sulfuric acid solution is performed a reflux at 90° C. for 3 h, and then is cooled, filtered, washed and dried to obtain the modified silicon dioxide nanoparticles.

Step 2 obtains the composite polyvinyl alcohol preservative film, including the following steps. 10 g mixed PVA (a mixed volume ratio of PVA-1799:PVA-217 being 1:1) is taken to be added into 100 mL deionized water. 1 mol/L hydrochloric acid solution is added into the deionized water to adjust pH value of the deionized water to be 3 (referred to an acid solution). A temperature of the deionized water is raised to 90° C. for dissolving the mixed PVA for 2 h with a continuous stirring to obtain a mixed solution. 3 g modified silicon dioxide nanoparticles obtained by the step 1 is added into the mixed solution to mix evenly. And then, 1 g titanium dioxide nanoparticles (with a particle size of 60 nm) are added into the mixed solution, followed by stirring for 1 h. The mixed solution is placed for standing overnight to obtain a standing solution. The standing solution is defoamed and scraped film to obtain the composite polyvinyl alcohol preservative film. And a thickness of the composite polyvinyl alcohol preservative film is 0.02 mm.

Properties of the obtained composite polyvinyl alcohol preservative film in the embodiment 2 are as shown in Table 1.

Embodiment 3

The disclosure provides a preparation method of a composite polyvinyl alcohol preservative film with a low luminous transmittance, including the following steps.

Step 1 obtains modified silicon dioxide nanoparticles, including the following steps. 1 g $SiO_2$ nanoparticles with the particle size of 500 nm are dispersed in 50 mL toluene solution. 1.8 mL CTES is added into the toluene solution for a reaction at 100° C. for 24 h to obtain a reaction solution. The reaction solution is cooled down, and then filtered, washed and dried to obtain a solid. The solid is added into a dilute sulfuric acid solution (with a concentration of 49%) to obtain a mixed dilute sulfuric acid solution. The mixed dilute sulfuric acid solution is performed a reflux at 90° C. for 3 h, and then is cooled, filtered, washed and dried to obtain the modified silicon dioxide nanoparticles.

Step 2 obtains the composite polyvinyl alcohol preservative film, including the following steps. 10 g mixed PVA (a mixed volume ratio of PVA-1799:PVA-217 being 1:1) is taken to be added into 100 mL deionized water. 1 mol/L hydrochloric acid solution is added into the deionized water to adjust pH value of the deionized water to be 3 (referred to an acid solution). A temperature of the deionized water is raised to 90° C. for dissolving the mixed PVA for 2 h with a continuous stirring to obtain a mixed solution. 3 g modified silicon dioxide nanoparticles obtained by the step 1 is added into the mixed solution to mix evenly. And then, 1 g titanium dioxide nanoparticles (with a particle size of 60 nm) are added into the mixed solution, followed by stirring for 1 h. The mixed solution is placed for standing overnight to obtain a standing solution. The standing solution is defoamed and scraped film to obtain the composite polyvinyl alcohol preservative film. And a thickness of the composite polyvinyl alcohol preservative film is 0.02 mm.

Properties of the obtained composite polyvinyl alcohol preservative film in the embodiment 3 are as shown in Table 1.

Contrast Embodiment 1

A preparation method of a purified polyvinyl alcohol preservative film includes the following steps.

10 g mixed PVA (a mixed volume ratio of PVA-1799:PVA-217 being 1:1) is taken to be added into 100 mL deionized water. A temperature of the deionized water is raised to 90° C. for dissolving the mixed PVA for 2 h with a continuous stirring to obtain a mixed solution. The mixed solution is placed for standing overnight to obtain a standing solution. The standing solution is defoamed and scraped film to obtain the purified polyvinyl alcohol preservative film. And a thickness of the obtained purified polyvinyl alcohol preservative film is 0.02 mm.

Contrast Embodiment 2 (with the Particle Size of the Modified Silicon Dioxide Nanoparticles of 1200 nm)

Step 1 obtains modified silicon dioxide nanoparticles, including the following steps. 1 g $SiO_2$ nanoparticles with the particle size of 1200 nm are dispersed in 50 mL toluene solution. 1.8 mL CTES is added into the toluene solution for a reaction at 100° C. for 24 h to obtain a reaction solution. The reaction solution is cooled down, and then filtered, washed and dried to obtain a solid. The solid is added into a dilute sulfuric acid solution (with a concentration of 49%) to obtain a mixed dilute sulfuric acid solution. The mixed dilute sulfuric acid solution is performed a reflux at 90° C. for 3 h, and then is cooled, filtered, washed and dried to obtain the modified silicon dioxide nanoparticles.

Step 2 obtains the composite polyvinyl alcohol preservative film, including the following steps. 10 g mixed PVA (a mixed volume ratio of PVA-1799:PVA-217 being 1:1) is taken to be added into 100 mL deionized water. 1 mol/L hydrochloric acid solution is added into the deionized water to adjust pH value of the deionized water to be 3 (referred to an acid solution). A temperature of the deionized water is raised to 90° C. for dissolving the mixed PVA for 2 h with a continuous stirring to obtain a mixed solution. 3 g modified silicon dioxide nanoparticles obtained by the step 1 is added into the mixed solution to mix evenly. And then, 1 g titanium dioxide nanoparticles (with a particle size of 60 nm) are added into the mixed solution, followed by stirring for 1 h. The mixed solution is placed for standing overnight to obtain a standing solution. The standing solution is defoamed and scraped film to obtain the composite polyvinyl alcohol preservative film. And a thickness of the composite polyvinyl alcohol preservative film is 0.02 mm.

Properties of the obtained polyvinyl alcohol composite preservative film in the contrast embodiment 2 are as shown in Table 1.

Contrast Embodiment 3 (not Modifying the Silicon Dioxide Nanoparticles)

10 g mixed PVA (a mixed volume ratio of PVA-1799:PVA-217 being 1:1) is taken to be added into 100 mL deionized water. 1 mol/L hydrochloric acid solution is added into the deionized water to adjust pH value of the deionized water to be 3 (referred to an acid solution). A temperature of the deionized water is raised to 90° C. for dissolving the mixed PVA for 2 h with a continuous stirring to obtain a mixed solution. 3 g silicon dioxide nanoparticles with the particle size of 1200 nm are added into the mixed solution to mix evenly. And then, 1 g titanium dioxide nanoparticles (with a particle size of 60 nm) are added into the mixed solution, followed by stirring for 1 h. The mixed solution is placed for standing overnight to obtain a standing solution. The standing solution is defoamed and scraped film to obtain the composite polyvinyl alcohol preservative film. And a thickness of the composite polyvinyl alcohol preservative film is 0.02 mm.

Contrast Embodiment 4

Compared with the embodiment 1, a mass ratio of the PVA to the modified silicon dioxide nanoparticles is 10:1, and all other processes are the same as in the embodiment 1.

Contrast Embodiment 5

Compared with the embodiment 1, a mass ratio of the PVA to the modified silicon dioxide nanoparticles is 10:5, and all other processes are the same as in the embodiment 1.

TABLE 1

| Embodiment | Oxygen transmission ($cm^3 \cdot m/m^2 \cdot d \cdot Pa$) | Carbon oxide transmission ($cm^3 \cdot m/m^2 \cdot d \cdot Pa$) | Luminous Transmittance (%) | Haze (%) | Time for dark speck appearance (d) |
|---|---|---|---|---|---|
| Embodiment 1 | $1.14 \times 10^{-5}$ | $2.06 \times 10^{-4}$ | 85.38 | 9.02 | 8 |
| Embodiment 2 | $9.72 \times 10^{-6}$ | $1.84 \times 10^{-4}$ | 90.33 | 4.65 | 5 |
| Embodiment 3 | $1.08 \times 10^{-5}$ | $1.92 \times 10^{-4}$ | 87.26 | 7.31 | 6 |
| Contrast Embodiment 1 | $1.50 \times 10^{-5}$ | $2.54 \times 10^{-4}$ | 93.12 | 2.24 | 3 |
| Contrast Embodiment 2 | $1.16 \times 10^{-5}$ | $2.10 \times 10^{-4}$ | 84.23 | 9.39 | 7 |

TABLE 1-continued

| Embodiment | Oxygen transmission ($cm^3 \cdot m/m^2 \cdot d \cdot Pa$) | Carbon oxide transmission ($cm^3 \cdot m/m^2 \cdot d \cdot Pa$) | Luminous Transmittance (%) | Haze (%) | Time for dark speck appearance (d) |
|---|---|---|---|---|---|
| Contrast Embodiment 3 | $1.22 \times 10^{-5}$ | $2.15 \times 10^{-4}$ | 86.62 | 8.37 | 6 |
| Contrast Embodiment 4 | $1.28 \times 10^{-5}$ | $2.21 \times 10^{-4}$ | 89.75 | 5.42 | 6 |
| Contrast Embodiment 5 | $1.36 \times 10^{-5}$ | $2.33 \times 10^{-4}$ | 85.91 | 8.87 | 7 |

As shown in Table 1, comparing the embodiment 1 and the contrast embodiment 1, when the silicon dioxide nanoparticles are not added in the preservative film, the haze of the obtained preservative film in the contrast embodiment 1 is lowest, namely that the effect of light-proof is poor.

Comparing the embodiment 1 and the contrast embodiment 2, when the particle size of the silicon dioxide nanoparticles is 1200 nm, although the obtained preservative film in the contrast embodiment 2 has a relative good effect of light-proof, the dark specks appear earlier than the embodiment 1.

Comparing the embodiment 1 and the contrast embodiment 3, when the silicon dioxide nanoparticles are not modified, the obtained preservative film in the contrast embodiment 3 has a poor effect of light-proof. The silicon dioxide nanoparticles in the embodiment 1 are modified a carboxyl group therein to better bond with the PVA, thereby showing the better modified effect. Carboxylation of the silicon dioxide facilitates esterification cross-linking with a hydroxyl group of the PVA, and the chemical modification can better bond the silicon dioxide while improving the water resistance of PVA.

Comparing the embodiment 1 and the contrast embodiment 4, a mass ratio of the PVA to the modified silicon dioxide nanoparticles is 10:1, so that when the mass ratio of the modified silicon dioxide nanoparticles is low, the effect of the light-proof of the contrast embodiment 4 is poor. When an addition amount of the modified silicon dioxide nanoparticles is small, a denseness of the preservative film is poor. When the addition amount of the modified silicon dioxide nanoparticles is large enough, the nanoparticles fill the gap of the preservative film, making the preservative film denser and a path of gas molecules passing through the preservative film becomes tortuous, resulting in a decrease in luminous transmittance. As the mass ratio of SiO2 increases, the effect of light-proof increases as shown in the data of the embodiment 1 in Table 1 because the difference in the refractive indexes between the silicon dioxide and the polyvinyl alcohol. However, too much silicon dioxide filling in the preservative film can also lead to agglomeration resulting in a decrease in film crystallinity and an instead increase in the luminous transmittance as shown in the data of the contrast embodiment 5.

The silanol group on the surface of silicon dioxide is easily modified and can be compounded with the polyvinyl alcohol to improve its properties. Given that the refractive index of amorphous silicon dioxide is 1.46 and the refractive index of polyvinyl alcohol is 1.38, there is a certain difference between the refractive indexes of the two, and the particle size of silicon dioxide can be adjusted to attenuate the luminous transmittance at wavelengths greater than that of sunlight, the introduction of silicon dioxide can reduce the film's luminous transmittance without being completely invisible to changes in the quality of fruits and vegetables inside the package.

Film preservation often extends the storage life of food by changing the internal gas environment or by giving the preservative film some antimicrobial properties. The effect of luminous conditions is easily overlooked, especially for the foods sensitive to the sunlight, where photo-oxidation can reduce quality and storage life. The general means of light-proof is bagging, which is not easy to observe significant changes of the food inside and can even reduce the sugar content of the fruits due to extremely poor luminous transmittance.

Silicon dioxide nanoparticles are modified with carboxyl group, so that the bonding with the PVA is more solid and the modified silicon dioxide nanoparticles have better properties. The carboxylation of the silicon dioxide nanoparticles facilitates esterification cross-linking with the hydroxyl group of PVA, and chemical modification can better bond the silicon dioxide nanoparticles with the PVA while improving the water resistance of PVA.

As for the particle size of the silicon dioxide nanoparticles, when it is larger than a light wavelength (an ultraviolet of a range of 200 nm to 400 nm, a visible light of a range of 400 nm to 800 nm), the silicon dioxide nanoparticles can reduce the luminous transmittance. However, if the particle size is too large, it will also affect the compactness of the preservative film, which is not conducive to reducing the luminous transmittance, so that the best choice of the particle size of the silicon dioxide nanoparticles for the composite preservative film is 1000 nm.

The disclosure introduces the silicon dioxide nanoparticles with the different particle size based on the difference in the refractive indexes between the polyvinyl alcohol and the silicon dioxide, wavelengths of the sunlight, and the particle size of the filler. On the one hand, the increase of film roughness, the refractive index difference and large particle size of the silicon dioxide nanoparticles will refract and reflect the sunlight, reducing the luminous transmittance, while not seriously affecting the observation of color changes inside the package and the dark speck growth. On the other hand, the gas transmission and water resistance of the composite preservative film are improved, which is conducive to fresh storage. The disclosure only adjusts the particle size of the silicon dioxide, which is easily achieved, to obtain the composite preservative film. The comprehensive performance of the composite preservative film is improved, which is one of the excellent choices for the preservation of fruits and vegetables sensitive to the sunlight.

It should be noted that the above embodiments are only used to illustrate the technical solutions of the disclosure and not to limit it. Although the disclosure has been described in detail with reference to the illustrated embodiments, those skilled in the art should understand that the technical solutions of the disclosure can be modified or equivalent replaced without departing from the spirit and scope of the technical solutions of the disclosure, which should be covered in the protection scope of the disclosure.

What is claimed is:

1. A preparation method of a composite polyvinyl alcohol preservative film, comprising following steps:

dispersing 1 gram (g) of silicon dioxide nanoparticles with each particle size of 1000 nanometers (nm) in 50 milliliters (mL) of toluene solution, adding 1.8 mL of 2-cyanopropyl triethoxysilane (CTES) into the toluene solution for a reaction at 100 degrees Celsius (° C.) for 24 hours (h) to obtain a reaction solution; cooling the reaction solution down, and then filtering, washing and drying to obtain a solid, followed by adding the solid into a dilute sulfuric acid solution to obtain a mixed dilute sulfuric acid solution; performing a reflux on the mixed dilute sulfuric acid solution at 90° C. for 3 h, and then cooling, filtering, washing and drying to obtain the modified silicon dioxide nanoparticles; wherein a concentration of the dilute sulfuric acid solution is 49 wt %;

taking 10 g of PVA to be added into 100 mL of deionized water, adding 1 mole per litter (mol/L) of hydrochloric acid solution into the deionized water to adjust a potential of hydrogen (pH) value of the deionized water to be 3; raising a temperature of the deionized water to 90° C. for dissolving the PVA for 2 h with a continuous stirring to obtain a mixed solution; adding 3 g of the modified silicon dioxide nanoparticles into the mixed solution to mix, and then, adding 1 g of titanium dioxide nanoparticles with each particle size of 60 nm into the mixed solution, followed by stirring for 1 h; placing the mixed solution for standing overnight to obtain a standing solution, and defoaming the standing solution and scraping a film to obtain the composite polyvinyl alcohol preservative film; wherein a thickness of the composite polyvinyl alcohol preservative film is 0.02 millimeters (mm).

2. An application of the composite polyvinyl alcohol preservative film prepared by the preparation method of the composite polyvinyl alcohol preservative film according to claim 1, comprising: applying the composite polyvinyl alcohol preservative film in tropical fruit preservation.

\* \* \* \* \*